March 10, 1970  R. L. ADAMS  3,500,070
PHASE-SPLIT, BALANCED-BRIDGE, PULSED AC SIGNAL GATE CIRCUIT
Filed June 6, 1966
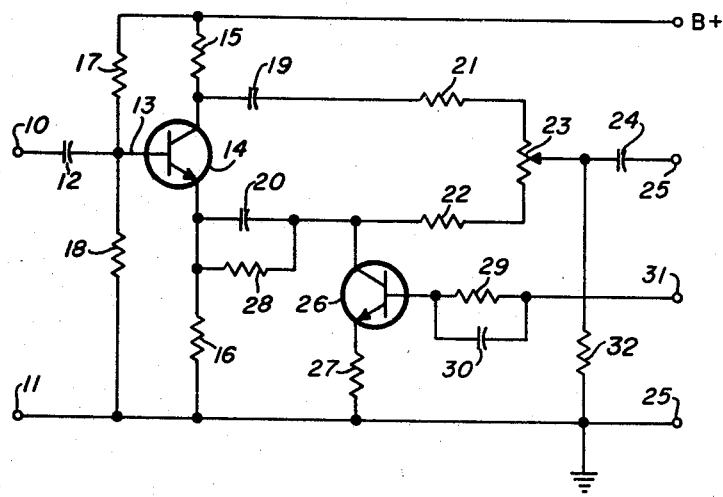
FIG. 1
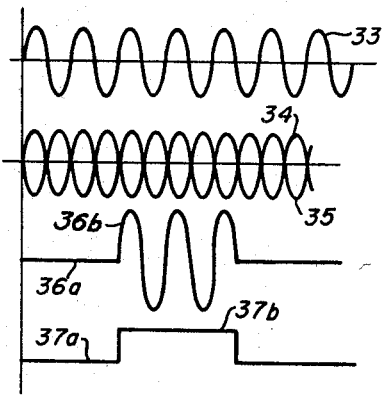
FIG. 2
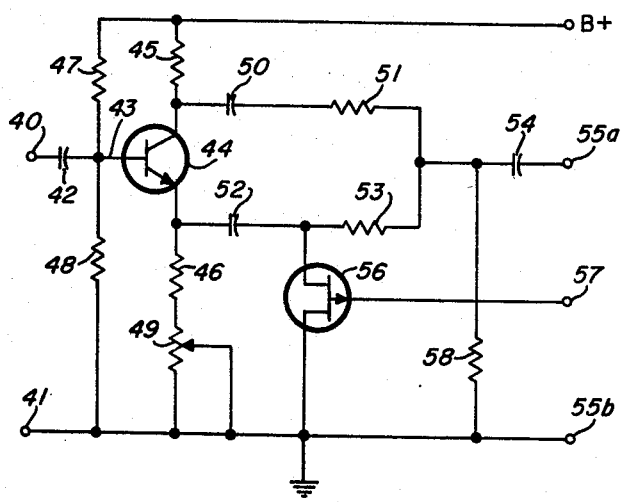
FIG. 3
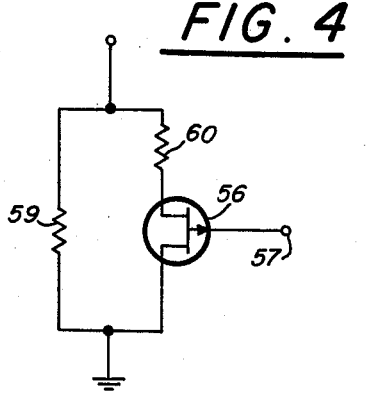
FIG. 4
INVENTOR.
ROBERT L. ADAMS
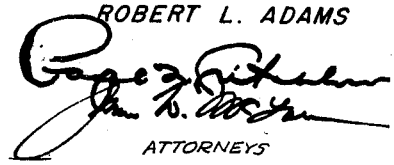
ATTORNEYS

United States Patent Office 3,500,070
Patented Mar. 10, 1970

---

3,500,070
PHASE-SPLIT, BALANCED-BRIDGE, PULSED AC SIGNAL GATE CIRCUIT
Robert L. Adams, San Diego, Calif., assignor to the United States of America as represented by the Secretary of the Navy
Filed June 6, 1966, Ser. No. 556,808
Int. Cl. H03k *17/00, 17/60*
U.S. Cl. 307—254
8 Claims

ABSTRACT OF THE DISCLOSURE

An AC input signal is amplified and split in phase to produce two outputs of identical amplitude but opposed one hundred eighty degrees in phase. The amplified and phased-opposed signals are each impressed upon an arm of a symmetrical bridge to produce substantially total mutual cancellation at the output of the bridge. One of the arms of the bridge is connected through a normally nonconductive control means to ground potential. When the control means is gated to become conductive, the signal in that arm is diverted to ground producing an amplified, pulsed output from the bridge for the duration of the gating signal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to a pulse gating circuit and more particularly is concerned with an alternating current pulse signal gate circuit employing a balanced bridge configuration.

Gating circuits for controlling the repetitive rate and the duration of pulses have found wide application in communications, telemetering and target detection systems of a wide variety of kinds. For example, many pulse systems are employed in connection with aerospace activities and underwater sounding systems. As will be readily appreciated by those knowledgeable in these arts, it is highly desirable that circuits employed in such applications be compact, light in weight, highly reliable under severe environmental conditions, and yet perform at a level of efficiency and accuracy which is at least comparable to that of prior art circuits.

In underwater sound systems, and more particularly in prior art deep submergence applications one method used to produce pulsed alternating current signals has been a method involving control by a ring modulator type of circuit which employed relatively large transformers, and required carefully matched electronic components; in addition, the typical ring modulator gating circuit was heavy in weight as well as large in size and was inherently limited in its signal suppression capabilities.

SUMMARY OF THE INVENTION

The present invention does not employ transformers and may be readily adapted to embodiment in solid state semi-conductor devices which provides a compact, relatively light weight, small circuit that is highly reliable under severe environmental conditions such as are often encountered in deep submergence application with underwater sound equipment.

Accordingly, it is a primary object of the present invention to provide an alternating current signal gating circuit which is highly reliable in operation, small in size and light in weight.

An equally important object of the present invention is to provide such an alternating current signal gate circuit which has a relatively broadband frequency response as well as affording a broad variety of pulse widths as may be desirable in particular applications.

A further object of the present invention is to provide such an alternating current signal gating circuit so conceived as to be readily embodied in solid state devices, rendering the circuit highly resistant to severe environmental conditions.

Yet another object of the present invention is to provide such an alternating current signal gating circuit which produces an accurately pulsed output signal having little or no pedestal, and exhibiting fast response, and low power consumption.

The present invention is conceived basically as a balanced bridge type of circuit. An alternating current input is normally fed to an amplifying-phase splitting device so as to provide two outputs which are in 180° phase opposition. The two alternating current outputs in 180° phase opposition appear at opposed matched arms of a bridge circuit so that normally they cancel each other out and thus produce no net output. An adjustable balancing arrangement is provided so that the arms of the bridge may be balanced in order to achieve the result of maximum cancellation of the 180° phase opposed signals.

Connected into circuit with one arm of the bridge is a path to ground which is normally non-conductive. A pulse input signal is applied to this path to render it conductive so that effectively one of the 180° phase opposed signals is grounded. In this manner a pulsed alternating current signal appears at the output of the bridge circuit during the period when one arm of the bridge is effectively grounded.

In its preferred embodiment the present invention employs transistors for the amplifying-phase splitting device and for the conductive path control circuit so that it is comprised entirely of solid state components. In its solid state form the present invention is accordingly impervious to severe environmental conditions; another significant improvement of the present invention is that it does not employ the weighty and sizeable transformers which were customarily employed in prior art devices having comparable performance characteristics.

These and other advantages, features, and objects of the present invention will be better appreciated from an understanding of the following description of several embodiments of the present invention together with the accompanying illustrative drawings and the invention's scope will be pointed out more particularly in the appended claims.

BRIEF DESCRIPTION OF THE DRAWINGS

In the drawings:

FIG. 1 is a schematic wiring diagram of an embodiment of the present invention;

FIG. 2 is an illustration of the waveforms of signals which may be developed during typical operation of an embodiment of the present invention;

FIG. 3 is a schematic wiring diagram of a preferred embodiment of the present invention; and FIG. 4 is a schematic wiring diagram of a temperature compensation arrangement which may be used in the gating control portion of an embodiment of the present invention.

DESCRIPTION OF THE PREFERRED EMBODIMENTS

In FIG. 1 there is shown a schematic wiring diagram having an input at terminals 10 and 11 where an alternating current signal, preferably of sine wave configuration, is received. A coupling capacitor 12 passes the alterlating current signal to connection with the base element 13 of a transistor 14 which may be of the 2N696 type, for example. Resistors 15 and 16 are connected to the collector and the emitter, respectively, of the transistor 14. The resistor 15 is, in turn, connected to a source of D.C. potential, while resistor 16 is connected to ground. A resistor 17 is connected from the B+ potential to the base element 13 of the transistor 14 to provide a bias to the transistor and similarly a resistor 18 connected from the base 13 of the transistor 14 to ground serves a comparable purpose.

Across the collector and emitter of the transistor 14 there is a balanced bridge arrangement comprising two capacitors 19 and 20 and two matched resistors 21 and 22. A variable tapped resistor 23 provides a means of balancing the two symmetrical portions of the bridge which include the capacitor 19 and resistor 21 in one arm, and the capacitor 20 and the resistor 22 in the other arm. The tap of the variable tap resistor 23 is connected through a coupling capacitor 24 to an output terminal 25.

A gating control portion of the circuit comprises a transistor 26 having its collector connected to the lower arm of the previously described balanced bridge arrangement, and its emitter connected through a resistor 27 to ground. A resistor 28 is connected from the emitter of the transistor 26 to bypass the capacitor and thereby provide an appropriate bias for the transistor 26 for its proper operation. The base of the transistor 26 is connected to a resistor 29 which in turn is connected in parallel with a capacitor 30, the capacitor serving the purpose of improving the response characteristics of the transistor 26. The pulse signal which controls the operation of the circuit of FIG. 1 as to pulsed output, is applied at the input terminal 31 of the gating control transistor 26.

The circuit of FIG. 1 receives an alternating current input across input terminals 10 and 11 and by the phase-splitting actions of transistor 14, develops 180° phase opposed signals of like alternating current configuration across resistors 15 and 16. Such signals also appear across the resistors 21 and 22. In the absence of an input to the gating control transistor 26, there is no conduction by the transistor 26. Therefore the matched 180° opposed alternating current signals developed by the balanced arms of the bridge circuit cancel each other out and substantially no output appears at the output terminal 25. A resistor of appropriate electrical value 32 serves to bypass direct current. The operation of the present invention, particularly with respect to the timed relationships of signals developed, will be better understood by reference to FIG. 2 which illustrates typical waveforms of signals developed during typical use of the embodiment of FIG. 1. The waveforms of FIG. 2 are greatly expanded for purposes of clarity and to facilitate illustration of the time relationships of the several signals developed.

The uppermost waveform of FIG. 2, designated by the numeral 33, represents the type of sine wave input which typically is applied to the input terminals 10 and 11. The signal developed across resistor 16 and also appearing across resistor 22 is of the type illustrated by the second waveform of FIG. 2 and designated by the numeral 34. It will be noted that this signal is in phase with the input alternating current signal as designated by waveform 33. The signal developed across the resistor 15 and also appearing across resistor 21 has a form such as that designated by the numeral 35 in the second line of waveforms shown in FIG. 2. It will be noted that the waveform 35 is commensurate in character and amplitude to the waveform 34 but is 180° opposed in phase. As a result, at the tap of the variable tap resistor 23 and the output terminals 25 there is a complete cancellation of the two waveforms 34 and 35 so that no output appears as is indicated by the portion 36a of the third waveform of FIG. 2.

The input to the gating control portion of the embodiment of FIG. 1 is represented by the fourth waveform 37 and as illustrated, when a D.C. signal is applied to the terminal 31, the transistor 26 becomes conductive effectively grounding the lower arm of the balanced bridge arrangement so that the signal in the form of the waveform 34 does not appear across resistor 22, nor at the balanced point of the variable tap resistor 23. Accordingly, only the waveform 35 appears at the variable tap resistor 23 and the output terminals 25. Thus a sharply pulsed output is developed as is indicated by the portion of the waveform indicated at 36. This output is sustained for the same period of time as the duration of the D.C. input to the gating portion of the circuit of FIG. 1 which controls the conduction of transistor 26; such pulse controlling input is applied to input terminal 31.

Those skilled in the art will realize that the increasing uses of relays and switching modes of operation in electronic circuits have developed a demand for circuitry which ideally will operate in the manner of a contactless relay. The perfect switch device then, would be one which has zero conductance in the "OFF" condition, zero impedance in the "ON" condition, and which would switch from one state to another without delay or transient interferences. Its operative characteristics should be independent of polarity and magnitude of the signals being switched and desirably the driving energy should be small as feasible.

Though numerous switching and gating circuits have been proposed and designed, many have been found to be less than desirable in operation because of deficiencies in frequency response, power consumption, the "ON-OFF" ratio, gain, size, weight, etc. In addition to ring modulators, which are basically an electromagnetic or transformer type of device, oscillator modulation has been proposed and tried, as has frequency doubling techniques as well as "ON-OFF" amplifiers (the latter having the advantage of wholly solid state operation).

The present invention, however, as illustrated in the embodiment of FIGS. 1 and 3, provides a cleanly pulsed output having virtually no D.C. pedestal, fast response, small size, low power consumption, broadband frequency response, as well as a broadband of realizeable pulse widths. It has been found in practice, for instance, that the configuration as illustrated in the embodiment of FIG. 1 can provide greater than 70 db gating at 100 kilocycles per second employing a B+ of only 15 volts D.C.; 0.05 v. RMS A.C. input can develop 0.4 v. RMS A.C. output under control of a 1.5 volts D.C. input pulse and having a frequency response from 400 c.p.s. to 450 kc. p.s. with pulse widths possible down to ten microseconds.

The concept of the present invention adapts itself readily to the employment of field effect transistors in the gating control portion of the balanced bridge circuit. Such field effect transistors operate as variable resistors over a portion of their characteristics and the change in resistance can readily be controlled by a properly applied voltage. Unlike conventional bipolar transistors, the field effect transistor is a unipolar device which simply means that the controlled signal path is through a region of uniform polarity. The signal path does not cross any junctions as in bipolar transistors and thus the device looks and operates like a simple resistor. Also, because the device is as a resistor in operation, there is no inherent offset voltage at the output. Utilizing these desirable characteristics a control gating portion of the present invention can be arranged as illustrated in FIG. 3. This circuit is simple, relatively low in cost, and meets all the most important requirements for pulsed signal gating purposes.

The configuration of the embodiment of FIG. 3 provides input terminals as shown at 40 and 41, a coupling capacitor 42, which connects to the base 43 of a transistor 44 having its collector connected to a resistor 45 and its emitter connected to a resistor 46. The other end of the resistor 45 is connected to a source of D.C. potential as indicated in FIG. 3. A resistor 47 is connected from B+ to the base 43 of the transistor 44 and in similar manner a resistor 48 is connected from the base of the transistor 44 to ground. The resistors 47 and 48 provide the necessary bias to render the transistor 44 properly operative as desired. A variable tap resistor 49 is connected in series circuit between the resistor 46 and ground; this arrangement provides means by which the resistive value connected from the emitter of the transistor 44 to ground may be accurately and conveniently balanced against the resistive value connected from the collector of the transistor 44 to B+, so that signals of identical amplitude will be developed across the respective resistive values.

A coupling capacitor 50 is connected to the collector of transistor 44 and in series with a fixed resistor 51 to form one arm of a balanced bridge. The emitter of the transistor 44 is connected to a similar coupling capacitor 52 and a fixed resistor 53 of resistive value identical to that of the resistor 51, completing a balanced bridge circuit across the collector and emitter terminals of the transistor 44. At the common point of connection of fixed resistors 51 and 53, a coupling capacitor 54 provides connection for A.C. output to the terminal 55.

The amplifier, phase-splitter transistor 44 may be of the 2N706A type, while a second transistor of the field effect transistor type is employed for the gating control portion of the circuit of FIG. 3. This latter field effect transistor shown at 56 may be of the 2N2499 type. The source of the transistor 56 is connected to the lower arm of the balanced bridge circuit between the coupling capacitor 52 and the fixed resistor 53, while its drain is connected to ground. The gate of the field effect transistor 56 is connected to an input terminal 57.

As in the operation described in respect to FIG. 1 and illustrated in the waveforms of FIG. 2, when no input signal is applied to the input terminal 57 of the embodiment of FIG. 3 the sine wave input to input terminals 40 and 41 is developed in opposed phase relationship across the balanced arms of the bridge so as to be mutually cancelling thereby providing substantially no output at terminals 55a and b. (An appropriate resistor 58 is connected from the balanced point of the bridge to ground so as to provide a direct current path.) Upon the application of a D.C. input signal to gate 57, the field effect transistor 56 is rendered conductive. As a result the lower arm of the balanced bridge circuit is effectively grounded so that no signal is developed across resistor 53 and the mutual cancellation effect between the arm of the bridge is eliminated. Accordingly, a single sine wave signal appears at the output terminals 55a and 55b, which waveform is 180° reversed with respect to the phase of the input signal to the input terminals 40 and 41, and which waveform is amplified as well, with respect to the input signal.

In certain severe environmental conditions, particularly in confined space, high temperatures may be developed so that it is desirable to provide a temperature compensation arrangement in the gating control portion of the circuit. Such a temperature compensation arrangement is illustrated in FIG. 4. In FIG. 4 like elements are designated by the same numerical designations as in FIG. 3. For instance, the field effect transistor 56 is shown with its source connected to a fixed resistor 60 while its drain is connected to ground and its gate is connected to input terminal 57. Connected in parallel with the fixed resistor 60 is a second fixed resistor 59.

For a 2N2499 field effect transistor, changes in temperature will affect the "on" resistance primarily, as a positive coefficient of approximately 0.66% per degree centigrade in the arrangement illustrated in FIG. 3. When resistors 59 and 60 are added as shown in FIG. 4, the total resistance in the circuit may be expressed as $$R_T = \frac{R_2(R_1 + r_{DS})}{R_2 + R_1 + r_{DS}}$$

where $R_1$ is the resistive value of element 60 as illustrated in FIG. 4, $R_2$ is the resistive value of element 59 therein and $r_{DS}$ is the incremental drain-to-source resistance. The temperature variability relative to $r_{DS}$ can be found by differentiating $$\frac{\Delta R_T}{\Delta r_{DS}} \left[ \frac{R_2}{R_2 + R_1 + r_{DS}} \right]^2$$

Thus if $R_1 = r_{DS}$ and $R_2 = 2R_1$, then $R_T = r_{DS}$ and the temperature variable $R_T / r_{DS} = \frac{1}{4}$ with the result that dependence on temperature has been reduced by a factor of four. However, use of the temperature compensation circuit will seriously reduce the effectiveness of the gating in most applications, and may therefore not be desirable.

In some applications the main concern may not be with the "ON" condition but more with rejection of signals during the "OFF" condition and accordingly temperature effects may not be of primary concern. When the field effects transistor, as employed in the schematic illustration of FIG. 3, is in its "OFF" condition it presents a high impedance to one leg of the bridge and therefore does not appreciably alter the equivalent emitter resistance. If one assumes that the gain of the transistor stage is equal to the load resistor value divided by the emitter resistor value, and that $R_L = R_E$, then the gain $A_V = 1$. Thus when operating in its phase splitting mode little or no amplification is realized. When the field effect transistor is in its "ON" condition, however, the $r'_{DS}$ is connected in parallel with the emitter resistor and the voltage gain increases. With $R_E = 5.1K$ ohms and $r'_{DS} = 600$ ohms the $A_V = 9.50$ or 19.6 db. Therefore, when one arm of the bridge is effeteively grounded under control of this gating control portion of the circuit significant amplification is realized. The waveforms of FIG. 2 represent such amplification by a greater amplitude of waveform 36b, which however is not a scalar representation.

Now if the $r'_{DS}$ changes by as much as fifty percent, representing a temperature change of 75° centigrade the voltage gain will be $A_V = 6.66$ or 16.5 db. Therefore, an amplitude change of only 3 db will result from the field effects transistor when the temperature change is as much as 75° centigrade.

Negligible D.C. offset appears on the output because unlike bipolar or bidirectional transistors the gate requirements of a field effects transistor are extremely small. Also, because of its very high input impedance, the field effect transistor will not load the control pulse and will isolate the control input pulse from the signal circuits. The input impedance to the field effects transistor control element is nearly ten megohms. Thus, the field effects transistor as employed in the embodiment illustrated in FIG. 3 and illustrated also in the temperature compensation arrangement of FIG. 4, which may be included as desired in the embodiment in FIG. 3, is the more desirable of solid state control elements.

Those skilled in the art will readily appreciate that the amplification and phase splitting circuit of the present invention provides a highly desirable alternating current gating circuit. It is particularly desirable for pulsed operation because of its adaptability to a broad band of pulsed alternating current frequencies as well as a wide variety of pulse widths.

In the embodiment of the present invention, as illustrated by FIG. 3, the circuit provides a basic gain of nearly 20 db. The frequency response was measured to the 70 c.p.s. to 450 kc. p.s.±3 db. Good transient response was observed at signal pulse bursts of 100 kc. p.s., 4 kc. p.s. and 100 c.p.s. The signal build-up was nearly instantaneous in tests which indicated an actual response time of less than ½ cycle of a 100 kc. p.s. sine wave, or in other words less than 5 microseconds. The "ON-OFF" ratio was observed to be over 80 db. at relatively lower frequencies. The control voltage power dissipation was very low because of the field effects transistor high input impedance which in the particular embodiment of FIG. 3 was approximately 10 megohms. The required gating control input pulse was 8 volts; thus the control dissipation is about 6.4 microwatts. Total power consumption was also very low with only 1.1 milliamperes collector current drawn at +15 volts B+. The total power requirements of the entire circuit were less than 20 milliwatts. Since the alternating current gating circuit of the present invention is a solid state device entirely, the entire circuit may be assembled in a volume of approximately three cubic inches and as previously explained the temperature characteristics of the device can be significantly improved by the temperature compensation arrangement illustrated in FIG. 4, though at some sacrifice of the "ON-OFF" ratio, or the most desirable gating operation.

Obviously many modifications and variations of the present invention are possible in the light of the above teachings. It is therefore to be understood that within the scope of the appended claims the invention may be practiced otherwise than as specifically described.

What is claimed is:
1. An A.C. signal gating circuit comprising:
   an amplifying-phase splitting means for developing first and second substantially sinusoidal alternating current outputs of identical amplitude in 180° phase opposition to each other in response to a substantially sinusoidal alternating current input;
   a substantially symmetrical bridge arrangement having first and second arms connected to receive said first and second substantially sinusoidal alternating current outputs, respectively;
   an output terminal connected to the balance point of said bridge arrangement for producing total mutual cancellation of said first and second outputs; and
   control means connected between one of said bridge arms and ground potential, said means being normally non-conductive and responsive to a gating input signal to become conductive for grounding one of said arms and developing a pulsed substantially sinusoidal alternating current signal at said output terminal.

2. An A.C. signal gating circuit as claimed in claim 1 wherein said gating signal is a direct current pulse.

3. An A.C. signal gating circuit as claimed in claim 1 and including selectively variable means connected in said bridge circuit for establishing said balance.

4. An A.C. signal gating circuit as claimed in claim 1 and including selectively variable means connected in circuit with said amplifying means for balancing the first and second outputs.

5. An A.C. signal gating circuit as claimed in claim 1 wherein said amplifying-phase splitting means is a semiconductor device.

6. An A.C. signal gating circuit as claimed in claim 1 and including a source of electrical potential wherein said amplifying-phase splitting means has three electrodes comprising one electrode adapted to receive an input signal, and first and second impedance means connected to said remaining electrodes, respectively, for developing first and second electrical potentials thereacross upon the flow of current through said amplifying-phase splitting means, said first impedance means being connected to said source of electrical potential and said second impedance means being connected to ground; wherein said bridge arrangement has a first arm connected to receive said first electrical potential, a second arm connected to receive said second electrical potential and an output terminal connected to the balance point therebetween; and
   wherein said control means is connected between said second arm and ground.

7. An A.C. signal gating circuit as claimed in claim 6 wherein said first and second bridge arms include like resistive elements and a variable tap resistive element connected therebetween having its tap connected to said output terminals.

8. An A.C. signal gating circuit as claimed in claim 1 and including means connected in circuit with said control means and responsive to changes in temperature for compensating for changes in resistive value of said control means.

References Cited

UNITED STATES PATENTS

| | | | |
|---|---|---|---|
| 3,222,608 | 12/1965 | Chick | 330—14 |
| 3,392,352 | 7/1968 | White | 307—251 X |
| 3,394,269 | 7/1968 | Miner | 307—229 |

OTHER REFERENCES

Pub. I. "Field Effect Transistors, Theory and Applications Notes," No. 2, June 1962, pp. 1–7 Amelco Semiconductor.

DONALD D. FORRER, Primary Examiner

S. D. MILLER, Assistant Examiner

U.S. Cl. X.R.

307—251, 257; 330—14